Sept. 15, 1942.  J. P. WEISENBERGER  2,296,007
GRAIN LOADER
Filed May 19, 1941
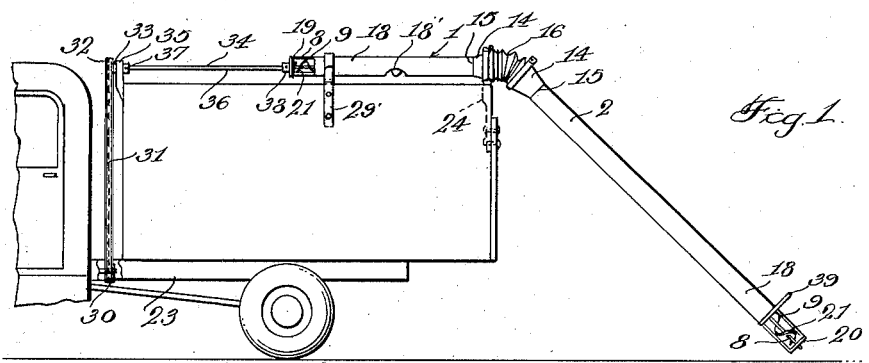
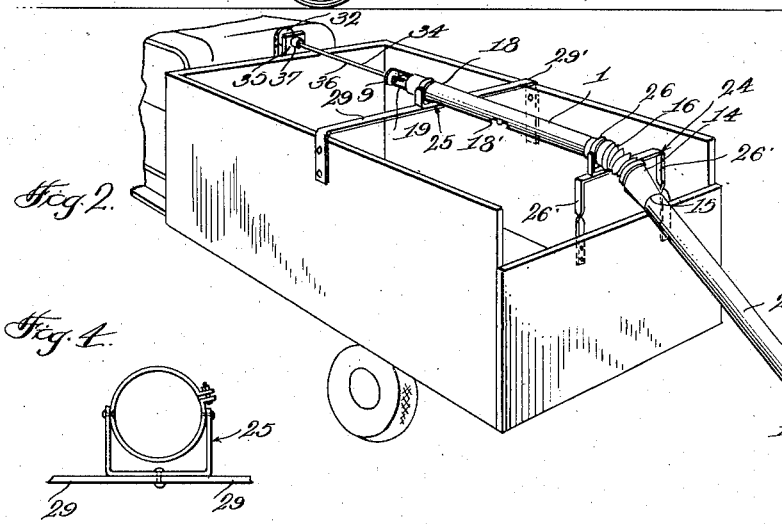
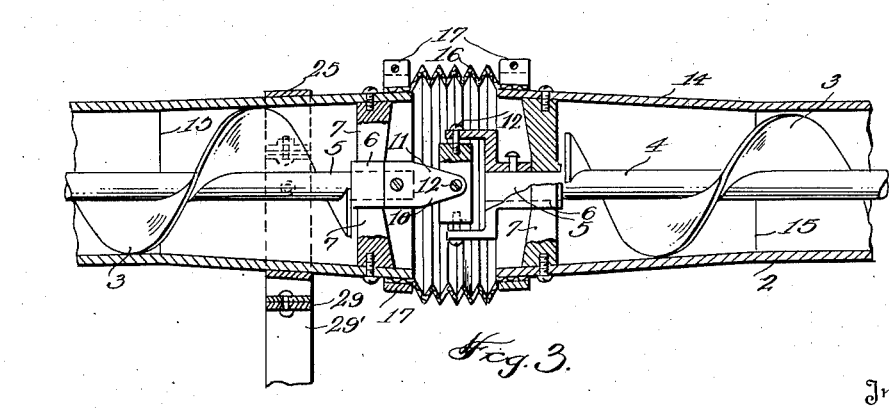
Inventor
Jacob Paul Weisenberger
By Christian R. Nielsen
Attorney Patented Sept. 15, 1942

2,296,007

UNITED STATES PATENT OFFICE 2,296,007

GRAIN LOADER

Jacob Paul Weisenberger, Grayson, Saskatchewan, Canada

Application May 19, 1941, Serial No. 394,209
In Canada June 17, 1940

1 Claim. (Cl. 214—83)

My invention relates to improvements in grain loaders and the principal object of this invention is to provide a device of the character herewithin described by means of which loose grain and other like material may speedily and efficiently be loaded from a storage bin or a similar receptacle into a transport vehicle.

A further object of this invention is to provide a device of the character herewithin described which consists of a plurality of sections flexibly connected at their adjacent ends to facilitate operation through various angles.

A further object of this invention is to provide a device of the character herewithin described which may be suitably driven from the power take-off of the associated vehicle.

A further object of this invention is to provide a device of the character herewithin described which is simple in structure and operation, and will not easily become damaged.

With the above more important objects in view and such other minor objects as may appear as the specification proceeds, my invention consists essentially in the arrangement and construction of parts all as hereinafter more particularly described, reference being had to the accompanying drawing, in which:

Figure 1 is a side elevation of my invention illustrating the same in situ on a motor vehicle.

Figure 2 is a perspective view of the device shown in Figure 1.

Figure 3 is a longitudinal cross sectional elevation of the flexible connection and universal coupling used in association with my invention.

Figure 4 is an end view of a bracket used for supporting my invention in position.

In the drawing, like characters of reference indicate corresponding parts in the different figures.

My invention will be seen to comprise a pair of tubular conduits 1 and 2 of a smaller and greater length respectively, each having a rotatable conveyor screw 3 positioned therein and secured to the respective longitudinally extending shaft 4. The latter are journalled at the mutually adjacent ends 5 thereof in a pair of bearings 6, each of which is in turn secured by means of the diametrically projecting brackets 7 to the conduits, the remaining ends 8 of the shafts being supported in suitable end structures 9, hereinafter more particularly described.

The ends 5 of the shafts 4 are connected together by means of a universal coupling 10 consisting of a pair of forked pieces 11 each secured to one of the shafts and pivotally attached by means of the bolts 12 to a floating spider 13.

The adjacent ends 14 of the conduits 1 and 2 taper outwardly from approximately the planes 15 to accommodate the universal coupling previously described, and are joined together by means of a flexible connection 16 which is of an accordion shaped configuration and retained in position upon the conduit by means of suitable clamps 17.

The remaining ends 18 of my conduits are provided with the aforementioned end structures 9, each consisting of a pair of bracing rods 19 carrying a bearing plate 20 in which the ends 8 of the shafts 4 are journalled, and it will be observed that in this manner the ends 21 of the conveyors 3 protrude outwardly beyond the ends 18 of the conduits 1 and 2 to facilitate intake and discharge of the grain.

The conduit 1 is designed to be supported horizontally above the body 22 of a suitable motor vehicle 23 by means of a pair of brackets 24 and 25 best illustrated in the accompanying Figure 4, the former bracket comprises a split collar 26 adapted to embrace the conduit 1, having downwardly extended spaced legs 26' adapted to be securely fixed to the end gate of the vehicle body. The split collar 26 may be provided with a bolt or thumb 27 for securing the conduit therewithin.

The bracket 25 is identical to that of the bracket 24, but is supported by means of oppositely extended arms 29 of a length so as to span the body, transversely, each arm terminating in right-angular members 29' adapted to grip the side walls of the vehicle body. When the conduit is in position the discharge end 18 thereof will rest approximately above center of the body 22. The conduit 1 may also be provided with discharge openings 18', if desired.

My means for rotating the conveyor screws 3 comprises a sprocket wheel 30 secured to the power take-off of the vehicle 23 and connected by means of the chain 31 to a similar sprocket 32 mounted on the forward stub shaft 33 of a multisection drive shaft 34.

This stub shaft is journalled in a suitable bearing block 35 extending upwardly from the body 22 and is connected at the remaining end thereof to the intermediate shaft 34 by means of a conventional universal coupling 37. A further similar coupling 38 connects the opposite end of the shaft 36 to the forward end 8 of the conveyor shaft 4 positioned within my conduit 1, from which point the drive to the second conveyor shaft journalled in the conduit 2 is of course effected by means of the universal coupling 10 already described.

When my invention is in operation the free end 18 of the conduit 2 should be inserted into the bin from which it is desired to load the grain, and when the shafts 4 commence to rotate under the influence of the drive shaft 34 the conveyors 3 will of course, receive the grain and impel the same upwardly through the conduit 2, the flexible connection 16 and along the conduit 1 to discharge at the end 18 of the latter onto the center of the vehicle body 22.

A suitable handle bar 39 may be provided near the lower end of the conduit 2 for a convenient manipulation thereof, and it will of course be apparent that due to the provision of the various universal couplings and flexible connections in my invention, the angular relationship existing between the conduits 1 and 2 as well as that with respect to the associated drive shaft 34, may be varied to facilitate loading even under the most adverse of conditions.

Since various modifications can be made in my invention as hereinabove described and as illustrated in the accompanying drawing, and many apparently widely different embodiments of the same made within the scope of the claim without departing from such spirit and scope, it is intended that all matter contained in the accompanying specification and drawing shall be interrupted as illustrative only and not in a limiting sense, and I desire only such limitations placed thereon as are specifically expressed in the accompanying claim.

Having regard to the foregoing disclosure, the patent of which this specification forms part confers, subject to the conditions prescribed in the patent laws, the exclusive right, privilege and liberty of making, constructing, using and vending to others to be used, the invention as defined in claim submitted by the patentee as follows.

I claim:

A grain loading mechanism constructed for attachment to a grain-hauling truck consisting of a tubular conduit approximately one-half the length of the truck body and having a grain discharge opening intermediate its length, the conduit having a flared rear end, a second tubular conduit complemental to the flared end of the first conduit and similarly shaped, a concertina connection between the flared ends of the conduits, a conveyor screw in the first conduit having a shaft portion extended outwardly thereof for operative connection with a source of power, a conveyor screw in the second conduit and having a universal connection with the conveyor screw of the first conduit, said second named conduit having an opening at its free end for entry of grain therewithin, a pair of support brackets carried by the first conduit, one bracket being positioned at a point adjacent the connection between the two conduits and including leg members for attachment to the end gate of the truck body, the other bracket being connected to the conduit adjacent the opposite end and comprising oppositely extended arms having right angularly disposed members adapted to engage respective side walls of the truck body for securement thereto.

JACOB PAUL WEISENBERGER.